United States Patent
Kawamura et al.

(10) Patent No.: US 9,570,870 B2
(45) Date of Patent: Feb. 14, 2017

(54) METHOD FOR PRODUCING TERMINAL-EQUIPPED WIRE, TERMINAL-EQUIPPED WIRE AND TERMINAL CRIMPING DEVICE

(75) Inventors: Masayuki Kawamura, Yokkaichi (JP); Masahiro Imai, Yokkaichi (JP); Naoyuki Ueda, Yokkaichi (JP); Tomohiro Shibata, Yokkaichi (JP)

(73) Assignee: Sumitomo Wiring Systems, Ltd, Yokkaichi, Mie (JP)

( * ) Notice: Subject to any disclaimer, the term of this patent is extended or adjusted under 35 U.S.C. 154(b) by 302 days.

(21) Appl. No.: 14/352,330

(22) PCT Filed: Feb. 7, 2012

(86) PCT No.: PCT/JP2012/052664
§ 371 (c)(1),
(2), (4) Date: Apr. 17, 2014

(87) PCT Pub. No.: WO2013/057964
PCT Pub. Date: Apr. 25, 2013

(65) Prior Publication Data
US 2014/0311799 A1    Oct. 23, 2014

(30) Foreign Application Priority Data
Oct. 17, 2011    (JP) .................................. 2011-227954

(51) Int. Cl.
*H01R 4/64*    (2006.01)
*H01R 43/048*    (2006.01)
(Continued)

(52) U.S. Cl.
CPC ............ *H01R 43/048* (2013.01); *H01R 4/187* (2013.01); *H02G 15/06* (2013.01); *H01R 4/185* (2013.01);
(Continued)

(58) Field of Classification Search
CPC . H01R 4/72; H01R 13/5216; Y10T 29/49178; Y10T 29/49139; Y10T 29/49151; Y10T 29/49169; Y10T 29/49174; H02G 15/043; H02G 15/1806; Y10S 439/932
(Continued)

(56) References Cited

U.S. PATENT DOCUMENTS 3,146,519 A * 9/1964 Redwine ............. H01R 43/058
                                                                        174/84 C
6,482,034 B2 * 11/2002 Ozaki .................... H01R 4/188
                                                                        174/74 R
(Continued)

FOREIGN PATENT DOCUMENTS

JP     61-153988    7/1986
JP     09-306555    11/1997
(Continued)

OTHER PUBLICATIONS

JP 2003-168536 English translation.*
(Continued)

*Primary Examiner* — Steven T Sawyer
(74) *Attorney, Agent, or Firm* — Gerald E. Hespos; Michael J. Porco; Matthew T. Hespos

(57) ABSTRACT

The present invention aims to maximally reduce a projecting width of a projecting part formed on a terminal when the terminal is crimped to an exposed core part of an end part of a wire. To achieve this aim, a method for producing a terminal-equipped wire in which a crimping portion of a terminal is crimped to an exposed core part of an end part of a wire includes a) a step of arranging the exposed core part in the crimping portion, b) a step of sandwiching a part of the crimping portion between a lower die surface of a lower die and an upper die surface of an upper die and crimping the part of the crimping portion to the exposed core part, and c)

(Continued)

a step of pressing an end part of the crimping portion protruding from the upper die surface from above.

13 Claims, 9 Drawing Sheets

(51) Int. Cl.
*H02G 15/06* (2006.01)
*H01R 4/18* (2006.01)
*H01R 43/058* (2006.01)

(52) U.S. Cl.
CPC ........ *H01R 43/058* (2013.01); *Y10T 29/49185* (2015.01); *Y10T 29/53235* (2015.01)

(58) Field of Classification Search
USPC ............... 174/74 R, 78, 74 C, 84 R
See application file for complete search history.

(56) References Cited

U.S. PATENT DOCUMENTS

| 2008/0172864 A1* | 7/2008 | Yagi | H01R 43/048 29/753 |
| 2011/0094797 A1* | 4/2011 | Otsuka | H01R 43/0207 174/84 C |

FOREIGN PATENT DOCUMENTS

| JP | 11-155151 | 6/1999 |
| JP | 2000-285983 | 10/2000 |
| JP | 2003-168536 | 6/2003 |

OTHER PUBLICATIONS

JP09-306555 English translation.*
JP07-050191 English translation.*
International Search Report of Mar. 27, 2012.

* cited by examiner

METHOD FOR PRODUCING TERMINAL-EQUIPPED WIRE, TERMINAL-EQUIPPED WIRE AND TERMINAL CRIMPING DEVICE

BACKGROUND

1. Field of the Invention

The present invention relates to a technique for crimping a terminal to an exposed core part of a wire end part.

2. Description of the Related Art

Conventionally, a terminal-equipped wire is known from Japanese Unexamined Patent Publication No. 2000-285983. In Japanese Unexamined Patent Publication No. 2000-285983, a terminal is provided with a core crimping barrel and this core crimping barrel is caulked and crimped to a core exposed from the wire end.

An example of a protective coating coated on a steel plate is disclosed in Japanese Unexamined Patent Publication No. H11-166151.

A terminal is so configured that a connecting portion to be connected to a mating terminal and a core crimping barrel are coupled. Here, in caulking and crimping the core crimping barrel to a core exposed from a wire end, a compressive force is applied not to the entire core crimping barrel, but only to a part excluding the vicinity of an end part on the connecting portion side. This is because, if a compressive force is applied to the entire core crimping barrel including the vicinity of the end part on the connecting portion side, a load is applied to a coupling part of the core crimping barrel and the connecting portion and the coupling part may be deformed and damaged (e.g. cracked).

In the above mode, the core crimping barrel caulked and crimped to the core is shaped to gradually expand near the end part on the connecting portion side (bell-mouth shape), i.e. shaped such that the end part projects upward. If a projecting part is formed on a part of the terminal, when a protective agent for film formation is coated on a surface of a connecting part of the terminal and the wire, a protective film becomes locally thinner at this projecting part and it may not be possible to obtain sufficient protection performance. This problem becomes more notable as the projecting width of the projecting part increases.

Accordingly, the present invention aims to maximally reduce a projecting width of a projecting part formed on a terminal when the terminal is crimped to an exposed core part of an end part of a wire.

SUMMARY OF THE INVENTION

A first aspect of the present invention is directed to a method for producing a terminal-equipped wire in which a crimping portion of a terminal is crimped to an exposed core part of an end part of a wire, including the steps of a) arranging the exposed core part in the crimping portion; b) sandwiching a part of the crimping portion between a lower die surface of a lower die and an upper die surface of an upper die and crimping the part of the crimping portion to the exposed core part; and c) pressing an end part of the crimping portion protruding from the upper die surface from above. The method of the invention enables the projecting width of the projecting part of the terminal to be reduced reliably by a simple configuration.

Further, in the first aspect, the end part of the crimping portion protruding from the upper die surface is pressed from above by a lower end surface of a terminal pressing member moved toward the lower die in the step c); and the lower end surface of the terminal pressing member is a surface not having a wall surface area extending along a moving direction of the terminal pressing member.

The lower end surface preferably is a flat surface perpendicular to the moving direction of the terminal pressing member, thereby providing a particularly simple configuration of the terminal pressing member.

The upper die surface may be a groove-shaped surface cut from a tip part toward a base end part of the upper die; and the lower end surface of the terminal pressing member is arranged at a position closer to the base end part than a reference position, which is the position of a deepest part of the groove in a state where the upper die is closest to the lower die, in the moving direction of the terminal pressing member in a state where the terminal pressing member is closest to the lower die. Thus, the exposed core part is not likely to be damaged by the corner of the end part of the crimping portion since a vertical compression rate of the end part of the crimping portion protruding from the upper die surface is smaller than that of the part of the crimping portion crimped to the exposed core part.

The step c) of the method may be performed by pressing the end part of the crimping portion protruding from the upper die surface by the terminal pressing member moved in synchronization with the upper die when the upper die is moved toward the lower die to sandwich the crimping portion between the lower die and the upper die in the step b). Thus, the terminal-equipped wire can be produced efficiently since the steps b) and c) are simultaneously performed The upper die and the terminal pressing member preferably are formed integrally. Thus, the durability of the terminal pressing member is improved since the upper die and the terminal pressing member are united.

The invention also is directed to a method for producing a terminal-equipped wire in which a crimping portion of a terminal is crimped to an exposed core part of an end part of a wire, including the steps of a) arranging the exposed core part in the crimping portion; b) sandwiching a part of the crimping portion between a lower die surface of a lower die and an upper die surface of an upper die and crimping the part of the crimping portion to the exposed core part; c) pressing an end part of the crimping portion protruding from the upper die surface from above; and d) pressing a part of the exposed core part protruding from the crimping portion toward the terminal. The part of the exposed core part protruding from the crimping portion is pressed toward the terminal. Thus, the projection of the exposed core part from the terminal can be reduced maximally.

The part of the exposed core part protruding from the crimping portion preferably is pressed from above by a lower end surface of a core pressing member moved toward the lower die in the above-described step d); and the lower end surface of the core pressing member is a surface not having a wall surface area extending along a moving direction of the core pressing member. Accordingly, the projecting width of the exposed core part from the terminal can be reliably reduced by a simple configuration.

The upper die surface may be a groove-shaped surface cut from a tip part toward a base end part of the upper die; and the lower end surface of the core pressing member may be arranged at the same position as a reference position, which is the position of a deepest part of the groove in a state where the upper die is closest to the lower die, in the moving direction of the core pressing member in a state where the core pressing member is closest to the lower die. Thus, the projecting width of the exposed core part from the terminal can be reduced reliably.

In any of the above-described aspects of the invention, the upper die surface is a groove-shaped surface cut from a tip part toward a base end part of the upper die; and a deepest part of the groove is inclined in a direction toward the base end part as the deepest part extends toward an end on an end part of the upper die surface which faces an end part of the crimping portion not protruding from the upper die surface. The end part of the crimping portion protruding from the upper die surface is pressed from above when the terminal is crimped to the exposed core part of the end part of the wire. Thus, a projecting width of a projecting part formed on the terminal when the terminal is crimped to the exposed core part of the end part of the wire can be reduced maximally.

The invention also is directed to a terminal-equipped wire with a wire including a coated core and a terminal including a crimping portion crimped to an exposed core part of an end part of the wire, wherein the crimping portion includes a bottom plate portion and core crimping pieces in the form of long pieces extending from opposite sides of the bottom plate portion; target areas of the core crimping pieces are crimped to the exposed core part by being compressed and deformed to embrace the exposed core part; and end parts of the core crimping pieces excluding the target parts are pressed toward the bottom plate portion from above, whereby an upper side of the end part is formed into a flat shape. The end parts of the core crimping pieces excluding the target areas crimped to the exposed core part are pressed from above. Thus, the projecting width of the projecting part formed on the terminal when the terminal is crimped to the exposed core part of the end part of the wire is reduced maximally.

The invention further is directed to a terminal crimping device for crimping a crimping portion of a terminal to an exposed core part of an end part of a wire, including a lower die having an lower die surface on which the crimping portion having the exposed core part arranged therein is arranged; an upper die having an upper die surface arranged to face the lower die surface and configured to sandwich a part of the crimping portion between the lower die surface and the upper die surface and crimp the part of the crimping portion to the exposed core part by being moved toward the lower die; and a terminal pressing member configured to press an end part of the crimping portion protruding from the upper die surface from above by being moved toward the lower die, wherein the terminal pressing member presses the end part of the crimping portion protruding from the upper die surface from above by a lower end surface thereof; and the lower end surface of the terminal pressing member is a surface not having a wall surface area extending along a moving direction of the terminal pressing member and a flat surface perpendicular to the moving direction of the terminal pressing member. The end part of the crimping portion protruding from the upper die surface when the terminal is crimped to the exposed core part of the end part of the wire is pressed from above. Thus, the projecting width of the projecting part formed on the terminal when the terminal is crimped to the exposed core part of the end part of the wire is reduced maximally.

Objects, features, aspects and advantages of this invention will become more apparent upon reading the following detailed description along with the accompanying drawings.

DETAILED DESCRIPTION OF THE PREFERRED EMBODIMENTS

Hereinafter, a method for producing a terminal-equipped wire and a terminal crimping device according to an embodiment are described.

<1. Terminal-Equipped Wire 1>

Figure 1:
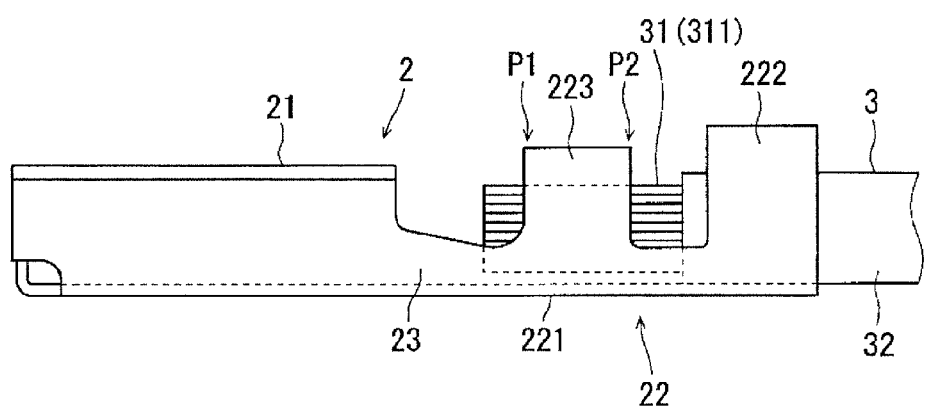
FIG. 1 is a schematic side view showing a terminal and a wire before a crimping operation.
Figure 2:
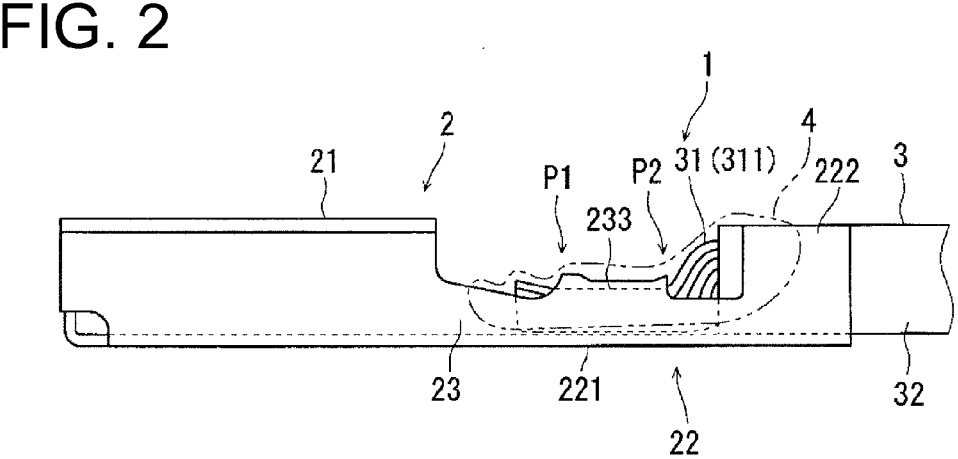
FIG. 2 is a schematic side view showing the terminal-equipped wire.

A terminal-equipped wire 1 is formed by crimping a terminal 2 to an end part of a wire 3. The terminal-equipped wire 1 is described with reference to FIGS. 1 and 2. FIG. 1 is a schematic side view showing the terminal 2 and the wire 3 before a crimping operation. FIG. 2 is a schematic side view showing the terminal-equipped wire 1.

The wire 3 is configured such that a coating 32 is coated on the outer periphery of a core 31 by extrusion coating. The core 31 is formed by a stranded wire of metal wires of copper, copper alloy, aluminum, aluminum alloy or the like or a single wire. Further, the coating 32 is removed at an end part of the wire 3 to expose the core 31. The core 31 exposed at the end part of the wire 3 is written as an "exposed core part 311" in some cases below.

The terminal 2 is configured such that a mating-side connecting portion 21 and a crimping portion 22 are coupled via a coupling portion 23.

The mating-side connecting portion 21 is a part to be connected to a mating terminal. Here, the mating-side connecting portion 21 is formed into a substantially tubular shape (so-called female terminal shape) and the mating terminal including a pin-like or tab-like connecting portion (so-called male terminal) is insertable and connectable. Note that the mating-side connecting portion 21 may be formed into a pin-like or tab-like shape (so-called male terminal) or may be formed into an annular shape or the like connectable to a mating member by a screw or the like.

The crimping portion 22 is configured to be able to be crimped and connected to the wire 3. Here, the crimping portion 22 includes a bottom plate portion 221, a pair of coating crimping pieces 222 and a pair of core crimping pieces 223. The bottom plate portion 221 is in the form of a long plate extending from a base end side of the mating-side connecting portion 21. The pair of coating crimping pieces 222 are in the form of long pieces extending from opposite sides of an end part of the bottom plate portion 221. The pair of core crimping pieces 223 are in the form of long pieces extending from opposite sides of the bottom plate portion 221 between the pair of coating crimping pieces 222 and the mating-side connecting portion 21. Out of the crimping portion 22, a part where the pair of coating crimping pieces 222 are formed and a part where the pair of core crimping pieces 223 are formed are formed to have a substantially U-shaped cross-sectional shape. Further, a clearance is provided between the pair of coating crimping pieces 222 and the pair of core crimping pieces 223. Note that end parts of the core crimping pieces 223 in a longitudinal direction on the side of the coupling portion 23 and end parts thereof on the side of the coating crimping pieces 222 are respectively written as "front end parts P1" and "rear end parts P2" in some cases below.

The coupling portion 23 is a part for coupling the mating-side connecting portion 21 and the pair of core crimping pieces 223 and formed into a gutter shape.

As described above, the terminal-equipped wire 1 is formed by crimping and connecting the terminal 2 to the end part of the wire 3. Specifically, in the terminal-equipped wire 1, the pair of core crimping pieces 223 (more precisely, caulking target parts A of the respective core crimping pieces 223 (see FIG. 3)) are crimped to the exposed core part 311 by being compressed and deformed to embrace the exposed core part 311, and the pair of coating crimping pieces 222 are crimped to the coating 32 by being compressed and deformed to embrace the end part of the coating 32, whereby the terminal 2 is crimped and connected to the end part of the wire 3.

Here, as is clarified later, end parts of the pair of core crimping pieces 223 on the side of the front end part P1 excluding the caulking target parts A are pressed toward the bottom plate portion 221 from above, whereby projecting widths of these parts are suppressed low. Further, an end part of the exposed core part 311 protruding from the pair of core crimping pieces 223 is also pressed toward the terminal 2 from above, whereby a projecting width of this part is also suppressed low.

A film portion 4 is formed on a surface of a crimp-connected part of the exposed core part 311 and the crimping portion 22. The film portion 4 covers the surface of the connected part of the exposed core part 311 and the crimping portion 22, thereby suppressing liquid deposition and the like on this part and, hence, fulfilling a function of suppressing degradation. Particularly, in the case of using aluminum or aluminum alloy for the core 31 and a material obtained by forming a tin plating layer on a surface of copper or copper alloy for the terminal 2, a potential difference between the two becomes larger. Thus, if moisture deposits on the connected part of the crimping portion 22 and the exposed core part 311, this moisture may act as an electrolytic solution to cause electrolytic corrosion. If the film portion 4 is formed on the surface of the crimp-connected part of the exposed core part 311 and the crimping portion 22, electrolytic corrosion on that surface part can be effectively suppressed. The film portion 4 can be formed by various methods. For example, the film portion 4 can be formed by, after a coating material such as resin is melted by heat and coated, cooling and curing a coating film.

In coating the coating material on the surface of the crimp-connected part of the exposed core part 311 and the crimping portion 22, if a coating target part partly projects, the film portion 4 may become thinner at that projecting part. In this terminal-equipped wire 1, a projecting width of the projecting part of the coating target part is suppressed low. Thus, a situation where the film portion 4 becomes locally thinner is unlikely to occur and the crimp-connected part of the exposed core part 311 and the crimping portion 22 is reliably protected.

<2. Terminal Crimping Device 5>

Figure 3:
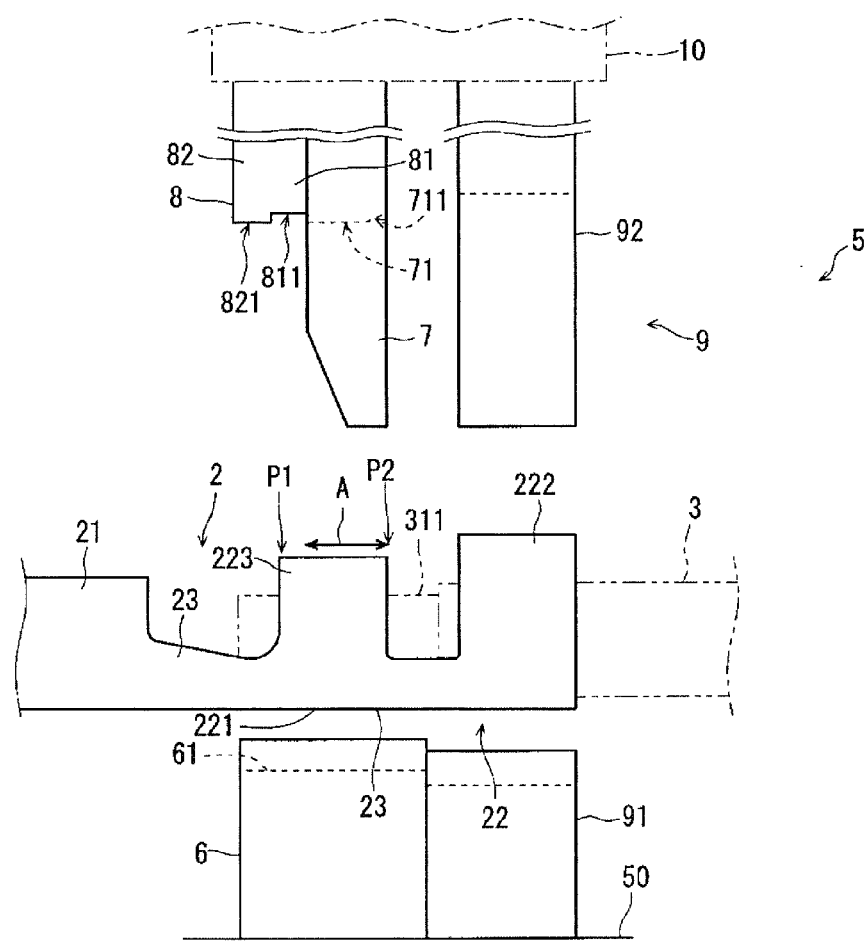
FIG. 3 is a diagram showing a terminal crimping device.
Figure 4:
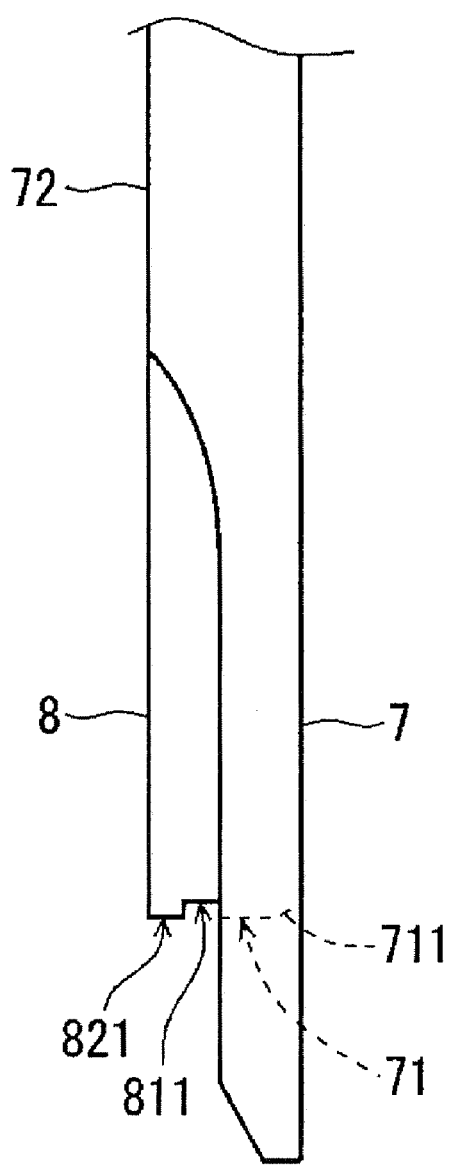
FIG. 4 is a side view showing an upper die for core and a pressing member provided in the terminal crimping device.
Figure 5:
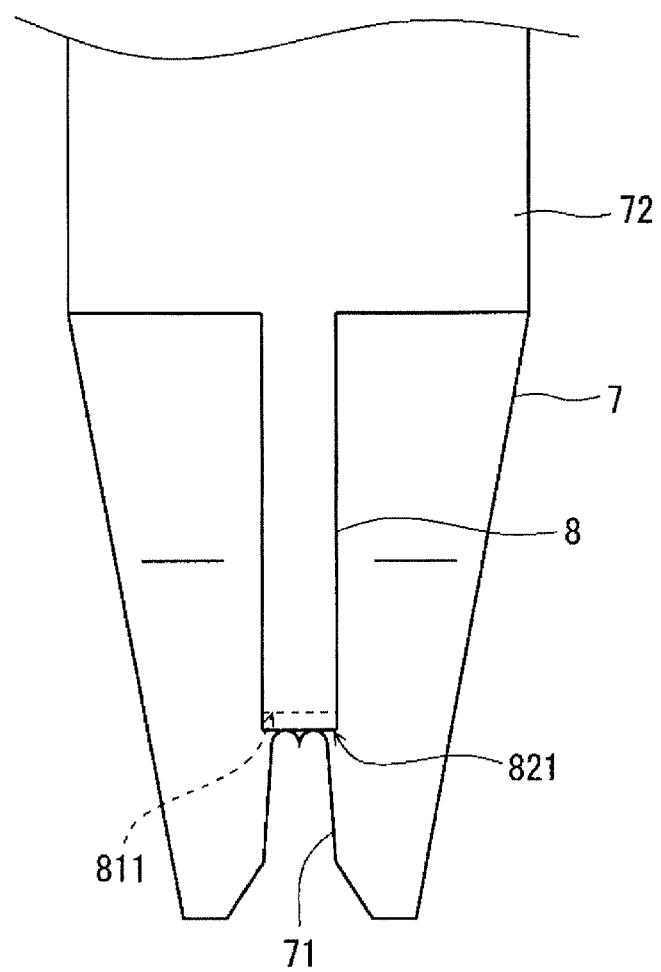
FIG. 5 is a front view showing the upper die for core and the pressing member provided in the terminal crimping device.

The terminal crimping device 5 used in the production of the terminal-equipped wire 1 is described with reference to FIGS. 3 to 5. FIG. 3 is a diagram showing the terminal crimping device 5. FIG. 4 is a side view showing an upper die for core 7 and a pressing member 8 provided in the terminal crimping device 5. FIG. 5 is a front view showing the upper die for core 7 and the pressing member 8.

The terminal crimping device 5 mainly includes a lower die for core 6, the upper die for core 7, the pressing member 8 and a die for coating 9.

<Lower Die for Core 6>

The lower die for core 6 is so fixed to a base 50 as to project upward. A lower die surface 61 which is in the form of a groove having an arcuate cross-section and in which the part of the crimping portion 22 where the pair of core crimping pieces 223 are formed can be placed is formed in the upper surface of the lower die for core 6. The lower die surface 61 can support the bottom plate portion 221 of the crimping portion 22 (specifically, the crimping portion 22 in a state where the end part of the wire 3 including the exposed core part 311 is arranged inside) placed thereon. The lower die for core 6 is also called an anvil.

<Upper Die for Core 7>

The upper die for core 7 is arranged to face the lower die for core 6. The upper die for core 7 is in the form of a long and narrow plate, and an upper die surface 71 extending in the form of a cut groove is formed from a tip part toward a base end part (see FIG. 5). The upper die surface 71 faces the lower die surface 61 of the lower die for core 6. A deepest (uppermost) part of the upper die surface 71 is shaped such that two upwardly convex arcuate surfaces are juxtaposed side by side, and opposite side surfaces of a tip side of the upper die surface 71 are formed to gradually separate from each other toward the tip side.

Here, the upper die surface 71 is formed to be shorter in a longitudinal direction (groove extending direction along a longitudinal direction of the exposed core part 311 to be arranged between the lower die for core 6 and the upper die for core 7) than the core crimping pieces 223 to be arranged between the lower die for core 6 and the upper die for core 7 (e.g. about ⅔ of the length of the core crimping pieces 223 in the longitudinal direction). One end part of the upper die surface 71 in the longitudinal direction is caused to face the rear end parts P2 of the core crimping pieces 223 to be arranged between the lower die for core 6 and the upper die for core 7 and the other end part is caused to face a position behind the front end parts P1 of the core crimping pieces 223 (closer to the rear end parts P2).

Further, on the end part of the upper die surface 71 in the longitudinal direction caused to face the rear end parts P2 of the core crimping pieces 223, an inclined surface area 711 inclined toward the base end part as it extends toward an end of the upper die surface 71 in the longitudinal direction is formed on a deepest part of the groove of the upper die surface 71. By forming the inclined surface area 711 on the end part of the upper die surface 71, the rear end parts P2 of the core crimping pieces 223 are deformed into a moderately expanded shape. However, an angle of inclination of the inclined surface area 711 is sufficiently small, and projecting widths of projecting parts formed on the rear end parts P2 of the core crimping pieces 223 are sufficiently small to be able to ensure protection performance of the film portion 4. Note that the upper die surface 71 is shaped to have substantially the same cross-sectional shape along the longitudinal direction except at the inclined surface area 711.

The upper die for core 7 is arranged above the lower die for core 6 to be movable toward and away from (reciprocally movable in directions toward and away from) the lower die for core 6 by an actuator 10 such as an air cylinder or a hydraulic cylinder. By moving the upper die for core 7 toward the lower die for core 6 in a state where the crimping portion 22 (crimping portion 22 in which the exposed core part 311 of the wire 3 is arranged) is arranged on the lower die surface 61 of the lower die for core 6, the crimping portion 22 (specifically, parts of the pair of core crimping pieces 223 of the crimping portion 22) are sandwiched between the lower die surface 61 of the lower die for core 6 and the upper die surface 71 of the upper die for core 7 (see FIG. 6). However, since the length of the upper die surface 71 in the longitudinal direction is shorter than those of the crimping pieces 223 in the longitudinal direction as described above, only the parts A of the pair of crimping pieces 223 are sandwiched by the upper die surface 71, and the front end parts P1 of the pair of core crimping pieces 223 and the vicinities thereof protrude from the upper die surface 71. For example, if the length of the upper die surface 71 is about ⅔ of those of the core crimping pieces 223 in the longitudinal direction, ⅓ areas of the core crimping pieces 223 in the longitudinal direction on the side of the front end parts P1 protrude from the upper die surface 71. The parts of the pair of core crimping pieces 223 sandwiched by the upper die surface 71 (hereinafter, also referred to as "caulking target parts A") are deformed to be curved inwardly along the upper die surface 71 while sliding in contact with the upper die surface 71 (see FIG. 7) when being sandwiched between the lower die surface 71 and the upper die surface 71. Specifically, the caulking target parts A of the pair of core crimping pieces 223 are deformed to cover the exposed core part 311. In this way, the crimping portion 22 is crimped to the exposed core part 311. The upper die for core 7 is also called a crimper.

<Pressing Member 8>

The pressing member 8 is arranged to be movable toward and away from (reciprocally movable in directions toward and away from) the lower die for core 6 in synchronization with the upper die for core 7. By being moved toward the lower die for core 6, the pressing member 8 presses the parts near the respective front end parts P1 of the pair of core crimping pieces 223 protruding from the upper die surface 71 and a tip edge part of the exposed core part 311 protruding from the pair of core crimping pieces 223 from above.

More specifically, the pressing member 8 includes a terminal pressing member 81 and a core pressing member 82. Here, the core pressing member 82 is integrally formed to the terminal pressing member 81 (specifically, to a surface of the terminal pressing member 81 opposite to an upper die for coating 92). Specifically, the pressing member 8 is formed by integrally forming the terminal pressing member 81 and the core pressing member 82. Further, the pressing member 8 is integrally formed to the upper die for core 7 (specifically, to a surface of the upper die for core 7 opposite to the upper die for coating 92). Specifically, an upper part of the upper die for core 7 is formed to be thicker than a lower part, and the pressing member 8 projecting from one principle surface of the upper die for core 7 is formed to extend downward from a widthwise central part of a lower end part of this thick part 72. This enables the pressing member 8 to move toward and away from the terminal 2 synchronously and integrally with the upper die for core 7.

The terminal pressing member 81 is arranged at a position above the respective front end parts P1 of the pair of core crimping pieces 223 of the terminal 2 arranged on the lower die for core 6. A tip (lower end) surface of the terminal pressing member 81 is a surface not having a wall surface area extending along a moving direction of the terminal pressing member 81 and, here, a flat surface perpendicular to the moving direction of the terminal pressing member 81. This lower end surface comes into contact with the parts near the respective front end parts P1 of the pair of core crimping pieces 223 protruding from the upper die surface 71 from above and presses these parts from above when the terminal pressing member 81 is moved toward the terminal 2. This lower end surface is also written as a "terminal pressing surface 811" below.

The terminal pressing surface 811 is formed at a position shifted upward (toward the base end part of the upper die for core 7) by a very short distance (e.g. about 0.1 mm) from the deepest part (deepest part except at the inclined surface area 711) of the upper die surface 71 in the moving direction of the terminal pressing member 81. Note that a width of the terminal pressing member 81 may be substantially equal to or larger than that of the lower die surface 61.

The core pressing member 82 is arranged at a position above a clearance between the pair of core crimping pieces 223 and the mating-side connecting portion 21 of the terminal 2 arranged in the lower die for core 6. A tip (lower end) surface of the core pressing member 82 is a surface not having a wall surface area extending along a moving direction of the core pressing member 82 and, here, a flat surface perpendicular to the moving direction of the core pressing member 82. This lower end surface comes into contact with the tip end part of the exposed core part 311 protruding from the pair of core crimping pieces 223 from above and presses this part from above when the core pressing member 82 is moved toward the terminal 2. This lower end surface is also written as a "core pressing surface 821" below.

The core pressing surface 821 is formed at the same position as the deepest part (deepest part except at the inclined surface area 711) of the upper die surface 71 in the moving direction of the core pressing member 82. Note that a width of the core pressing member 82 may be substantially equal to or larger than that of the lower die surface 61.

<Die for Coating 9>

The die for coating 9 includes a lower die for coating 91 and the upper die for coating 92 arranged to correspond to the pair of coating crimping pieces 222 of the terminal 2 on a base end side of the terminal 2 to be crimped with respect to the lower die for core 6 and the upper die for core 7.

The lower die for coating 91 is mounted on the base 50, and the upper die for coating 92 is provided to be movable toward and away from the lower die for coating 91 in synchronization with the upper die for core 7 by the actuator 10. When the crimping portion 22 is crimped to the exposed core part 311 between the lower die for core 6 and the upper die for core 7, the upper die for coating 92 also moves toward the lower die for coating 91 to deform the pair of coating crimping pieces 222 inwardly and crimp the crimping portion 22 to the coating 32 of the wire 3.

<3. Method for Producing the Terminal-Equipped Wire 1>

Figure 6:
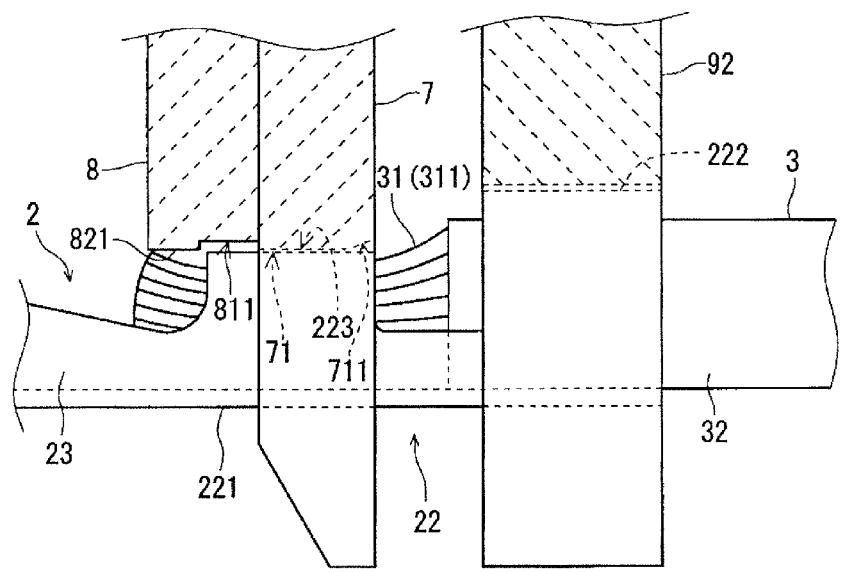
FIG. 6 is a diagram showing a production process of the terminal-equipped wire.
Figure 7:
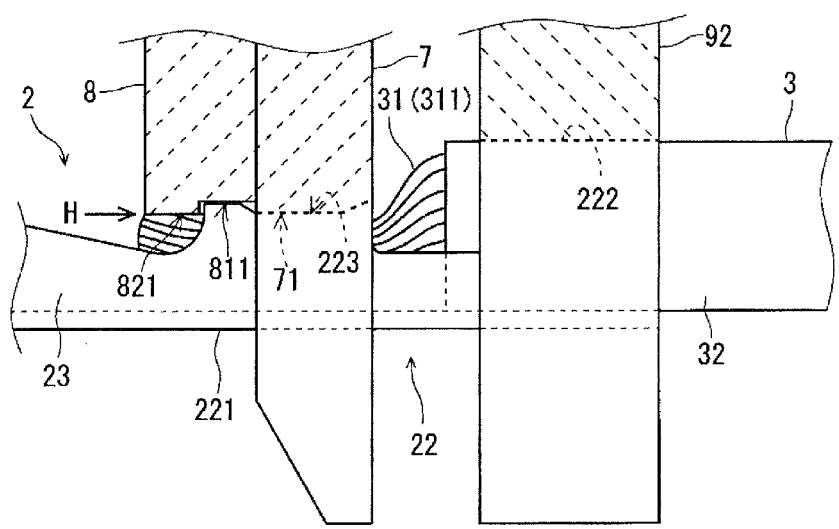
FIG. 7 is a diagram showing the production process of the terminal-equipped wire.

The method for producing the terminal-equipped wire 1 using the terminal crimping device 5 is described with reference to FIGS. 6 and 7 in addition to FIG. 3. FIGS. 6 and 7 are diagrams showing a production process of the terminal-equipped wire 1.

First, the upper die for core 7 and the upper die for coating 92 are separated from the lower die for core 6 and the upper die for coating 91. Further, the terminal 2 and the wire 3 are prepared, the crimping portion 22 of the terminal 2 is placed on the lower die for core 6 and the lower die for coating 91 and the exposed core part 311 is arranged in the crimping portion 22 (state shown in FIG. 3). At this time, a part of the bottom plate portion 221 of the crimping portion 22 corresponding to the pair of core crimping pieces 223 is arranged on the lower die surface 61 of the lower die for core 6 and a part of the bottom plate portion 221 of the crimping portion 22 corresponding to the pair of coating crimping pieces 222 is arranged on the lower die for coating 91. Further, the exposed core part 311 of the wire 3 is arranged between the pair of core crimping pieces 223 and the end part of the coating 32 is arranged between the pair of coating crimping pieces 222. At this time, one end part of the upper die surface 71 in the longitudinal direction (end part on the side where the inclined surface area 711 is formed) faces the rear end parts P2 of the core crimping pieces 223 arranged on the bottom plate portion 221 and the other end part faces positions of the core crimping pieces 223 behind the front end parts P1. Further, the terminal pressing surface 811 faces the end parts of the front end parts P1 of the core crimping pieces 223 arranged on the bottom plate portion 221 and the core pressing surface 821 faces the tip end part of the exposed core part 311 projecting from the core crimping pieces 223.

Subsequently, the upper die for core 7 and the upper die for coating 92 are moved toward the lower die for core 6 and the lower die for coating 91 (state shown in FIGS. 6 and 7). This causes the crimping portion 22 (specifically, the caulking target parts A of the core crimping pieces 223) to be sandwiched between the lower die for core 6 and the upper die for core 7, whereby the caulking target parts A of the pair of core crimping pieces 223 are deformed inwardly and crimped to the exposed core part 311. Simultaneously with this, the crimping portion 22 (specifically, part of the crimping portion 22 where the pair of coating crimping pieces 222 are provided) is sandwiched between the lower die for coating 91 and the upper die for coating 92 and the pair of coating crimping pieces 222 are deformed inwardly and crimped to the end part of the coating 32. According to this crimping mode, since a compressive force is not applied near the front end parts P1 of the core crimping pieces 223, a load is less likely to be applied to the coupling portion 23 and the coupling portion 23 is less susceptible to deformation, damage and the like.

On the other hand, when the upper die for core 7 is moved toward the lower die for core 6, the pressing member 8 is also moved toward the lower die for core 6 in synchronization with the upper die for core 7. This causes the terminal pressing surface 811 of the terminal pressing member 81 to press the part of the crimping portion 22 protruding from the upper die surface 71, i.e. the part near the respective front end parts P1 of the pair of core crimping pieces 223 protruding from the upper die surface 71 toward the bottom plate portion 211 from above and the core pressing surface 821 of the core pressing member 82 to press the tip edge part of the exposed core part 311 protruding from the pair of core crimping pieces 223 toward the terminal 2 from above. Since a compressive force from the upper die surface 71 is not applied to the parts of the pair of core crimping pieces 223 protruding from the upper die surface 71, these protruding parts try to project upward and expand in a tapered manner, but they are pressed from above by the terminal pressing surface 811, whereby projecting widths of the protruding parts are suppressed low. Since no compressive force is applied to lateral sides of the protruding parts, a load is less likely to be applied to the coupling portion 23 and the coupling portion 23 is less susceptible to deformation, damage and the like. Further, when the compressive force from the upper die surface 71 is applied to the core crimping pieces 223, the compressed exposed core part 311 elongates to protrude toward the coupling portion 23 and the tip part of the protruding exposed core part 311 tries to project upward (direction away from the bottom plate portion 221). However, this tip part is pressed from above by the core pressing surface 821, whereby a projecting width of this tip part is suppressed low.

Subsequently, the coating material is coated on the surface of the crimp-connected part of the exposed core part 311 and the crimping portion 22 to form the film portion 4 (see FIG. 2). In this way, the terminal-equipped wire 1 is obtained. As described above, the projecting width of the projecting part is suppressed low (i.e. unevenness is suppressed as much as possible) on the surface of the crimp-connected part of the exposed core part 311 and the crimping portion 22. This suppresses a local reduction in the thickness of the film of the coating material. Thus, the film portion 4 formed here is less likely to be partly thinned and the crimp-connected part of the exposed core part 311 and the crimping portion 22 is reliably protected.

<4. Effects>

In the above embodiment, the parts of the pair of core crimping pieces 223 protruding from the upper die surface 71 are pressed from above. Thus, the projecting widths of the projecting parts formed on these protruding parts can be reduced as much as possible. Further, in the above embodiment, the part of the exposed core part 311 protruding from the pair of core crimping pieces 223 is pressed toward the terminal 2. Thus, the projecting width of the exposed core part 311 from the terminal 2 can be reduced as much as possible. Particularly, in the case of using an aluminum wire or an aluminum alloy wire as the core 31, the core crimping pieces 223 tend to be compressed with a larger force and the tip part of the exposed core part 311 tends to largely elongate. However, according to the above embodiment, even in the case of using an aluminum wire or an aluminum alloy wire as the core 31, the projecting width of the exposed core part 311 from the terminal 2 can be reduced. If the surface of the crimp-connected part of the exposed core part 311 and the crimping portion 22 becomes less uneven, it is suppressed that the film portion 4 becomes partly thinner. Specifically, protection performance of the film portion 4 is ensured.

Further, in the above embodiment, the parts of the pair of core crimping pieces 223 protruding from the upper die surface 71 are pressed from above by the lower end surface (terminal pressing surface 811) of the terminal pressing member 81 moved toward the lower die for core 6. According to this configuration, the projecting width of the projecting part formed on the protruding part can be reliably reduced by a simple configuration. Further, since the terminal pressing surface 811 is a surface not having the wall surface area extending along the moving direction of the terminal pressing member 81, the parts of the pair of core crimping pieces 223 protruding from the upper die surface 71 are pressed only from above and no compressive force is applied to the lateral sides (lateral sides are in a free state) when the terminal pressing member 81 is moved toward the terminal 2. Thus, when the protruding parts are pressed, a force is less likely to be transmitted to parts other than the core crimping pieces 223 and the coupling portion 23 is less susceptible to deformation, damage and the like.

Further, since the terminal pressing surface 811 of the terminal pressing member 81 is a flat surface in the above embodiment, the configuration of the terminal pressing member 81 is particularly simple.

Further, in the above embodiment, the part of the exposed core part 311 protruding from the core crimping pieces 223 is pressed from above by the lower end surface (core pressing surface 821) of the core pressing member 82 moved toward the lower die for core 6. According to this configuration, the projecting width of the exposed core part 311 from the terminal 2 can be reliably reduced by a simple configuration.

Furthermore, in the above embodiment, the terminal pressing surface 811 is formed at the position shifted upward (toward the base end part of the upper die for core 7) by a very short distance from the deepest part of the upper die surface 71 in the moving direction of the terminal pressing member 81. Further, the core pressing surface 821 is formed at the same position as the deepest part of the upper die surface 71 in the moving direction of the core pressing member 82. Thus, the terminal pressing surface 811 is arranged at the position upwardly (toward the base end part of the upper die for core 7) of the position of the deepest part of the upper die surface 71 (reference position H) in the moving direction of the terminal pressing member 81 in a state where the upper die for core 7 and the pressing member 8 moved in synchronization with the upper die for core 7 are closet to the lower die for core 6 (state shown in FIG. 7). Further, the core pressing surface 821 is arranged at the same position as the reference position H in the moving direction of the core pressing member 82. According to this configuration, since a vertical compression rate of the parts of the pair of core crimping pieces 223 protruding from the upper die surface 71 is smaller than that of the caulking target parts A of the pair of core crimping pieces 223, a situation where the exposed core part 311 is damaged by the corners of the front end parts P1 of the core crimping pieces 223 is unlikely to occur. On the other hand, projecting heights of the parts of the exposed core parts 311 protruding from the core crimping pieces 223 becomes smaller than those of the front end parts P1 of the core crimping pieces 223, wherefore the projecting width of the exposed core part 311 from the terminal 2 can be reliably reduced.

Further, since the upper die for core 7 and the pressing member 8 are synchronously moved according to the above embodiment, a step of crimping the caulking target areas A of the pair of core crimping pieces 223 to the exposed core part 311, a step of pressing the parts of the pair of core crimping pieces 223 protruding from the upper die surface 71 from above and a step of pressing the part of the exposed core part 311 protruding from the core crimping pieces 223 from above are simultaneously performed. According to this configuration, the terminal-equipped wire 1 can be efficiently produced.

Further, since the upper die for core 7 and the pressing member 8 are united according to the above embodiment, the deformation of the pressing member 8 is suppressed and the durability of the pressing member 8 is improved. Further, the deposition of dust and the like between the upper die for core 7 and the pressing member 8 can be suppressed and maintainability is excellent.

Further, according to the above embodiment, the inclined surface area 711 is formed at the end part of the upper die surface 71 in the longitudinal direction on the side that faces the rear end parts P2 of the core crimping pieces 223. According to this configuration, the end parts (rear end parts P2) of the core crimping pieces 223 that do not protrude from the upper die surface 71 are deformed to expand in a tapered manner. Thus, a situation where the exposed core part 311 is damaged by the corners of the rear end parts P2 of the core crimping pieces 223 is unlikely to occur.

<5. Modifications>

Figure 8:
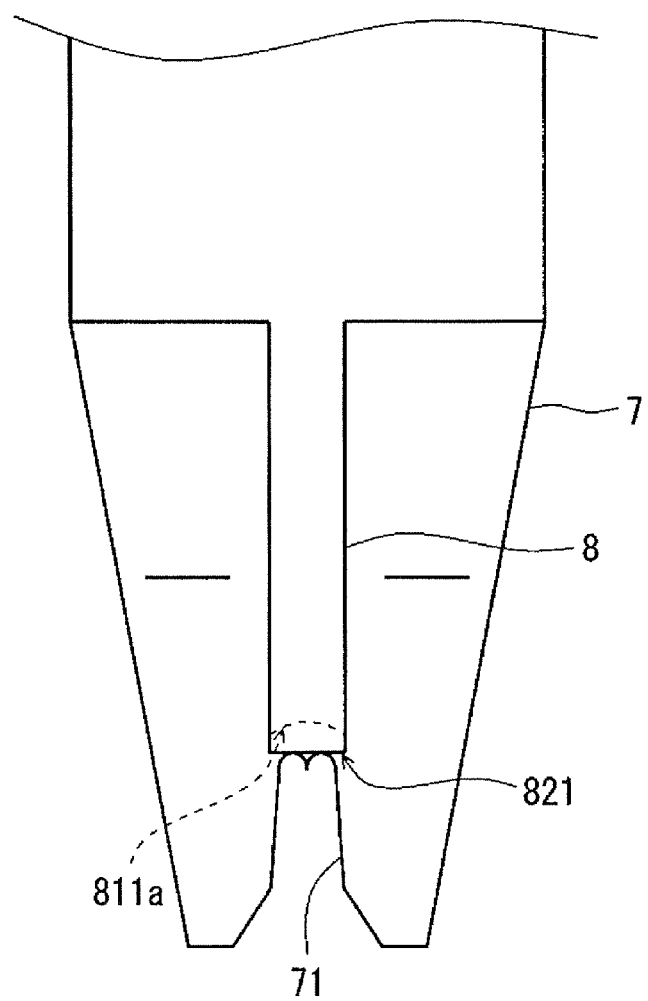
FIG. 8 is a front view showing an upper die for core and a pressing member according to a modification.
Figure 9:
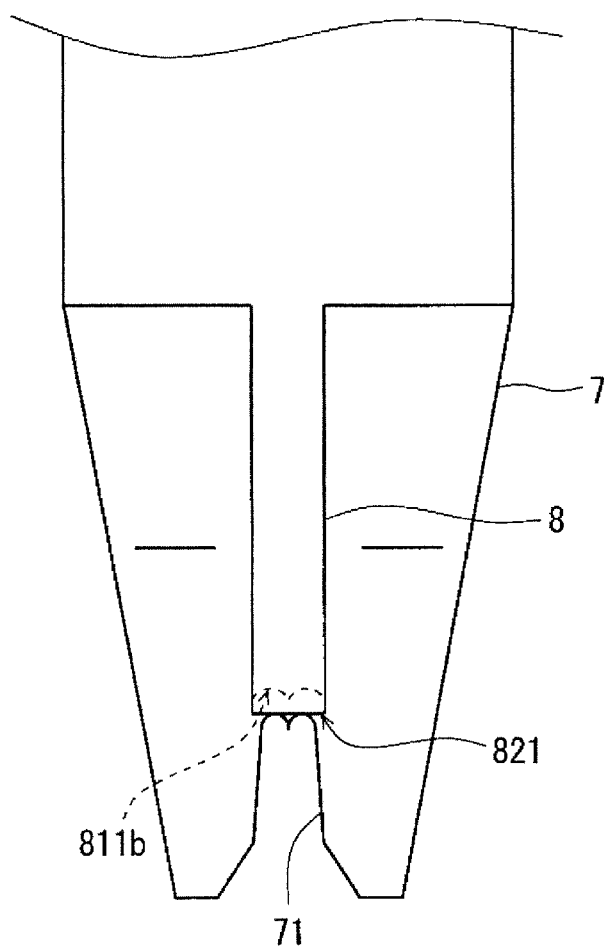
FIG. 9 is a front view showing an upper die for core and a pressing member according to a modification.

In the above embodiment, the terminal pressing surface 811 is preferably a surface not having the wall surface area extending along the moving direction of the terminal pressing member 81 (i.e. a surface shaped to allow the lateral sides of the terminal 2 to be in a free state without coming into contact with the lateral sides when the terminal pressing member 81 is moved toward the terminal 2), but such a terminal pressing surface 811 is not necessarily limited to the flat surface perpendicular to the moving direction of the terminal pressing member 81 as described above. For example, as shown in FIG. 8, a terminal pressing surface 811a may be formed by processing a surface perpendicular to the moving direction of the terminal pressing member 81 into an upwardly concave and moderately arcuate surface. Further, as shown in FIG. 9, a terminal pressing surface 811b may be formed by processing a surface perpendicular to the moving direction of the terminal pressing member 81 into a shape formed by two upwardly concave arcuate surfaces juxtaposed side by side.

Figure 10:
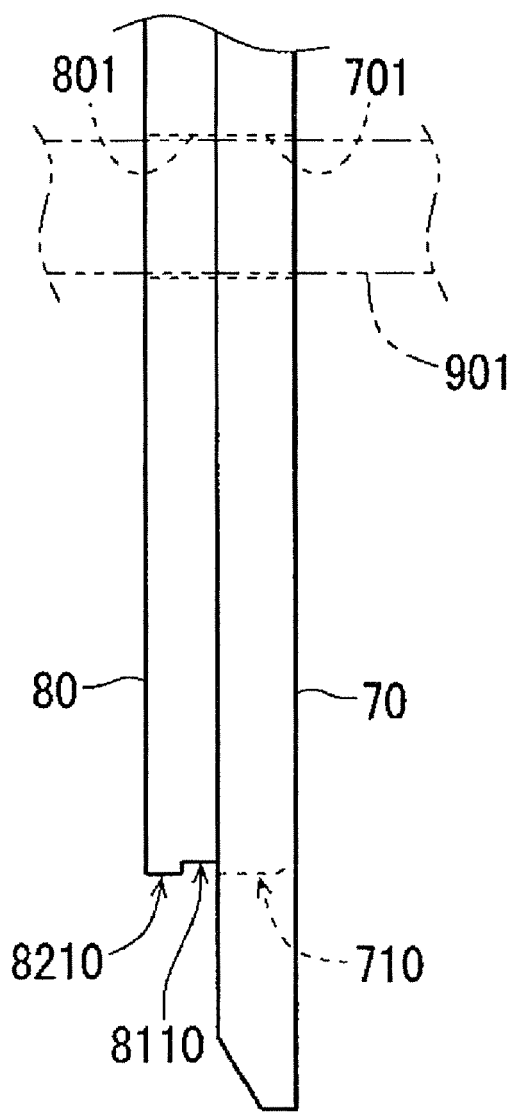
FIG. 10 is a side view showing an upper die for core and a pressing member according to a modification.

Further, although the pressing member 8 and the upper die for core 7 are integrally formed in the above embodiment, they need not necessary be integrally formed. For example, as shown in FIG. 10, an upper die for core 70 and a pressing member 80 may be separately formed. Here, the pressing member 80 is obtained by integrally forming a part corresponding to the thick part 72 and a part corresponding to the pressing member 8 in the above embodiment. The pressing member 80 is joined in close contact with the upper die for core 70. Here, the upper die for core 70 and the pressing member 80 are respectively formed with positioning holes 701, 801. By inserting a positioning pin 901 into the positioning holes 701, 801 with the upper die for core 70 and the pressing member 80 joined, the upper die for core 70 and the pressing member 80 are united and synchronously moved toward and away from the terminal 2 on the lower die for core 6. If the pressing member 80 and the upper die for core 70 are separately formed as just described, there is an advantage of facilitating the additional attachment of the pressing member 80 to the upper die for core 70, the single exchange of the pressing member 80 or the upper die for core 70, and the like.

Further, the separately formed upper die for core 70 and pressing member 80 may be independently (without synchronization) moved. For example, the upper die for core 70 and the pressing member 80 may be coupled to different actuators without being united. In this case, the terminal-equipped wire 1 can be produced by, after the upper die for core 70 is first moved toward the lower die for core 6 to deform the respective caulking target areas A of the pair of core crimping pieces 223 and crimp them to the exposed core part 311, moving the pressing member 80 toward the lower die for core 6 to press the parts of the pair of core crimping pieces 223 protruding from the upper die surface 71 from above and press the part of the exposed core part 311 protruding from the pair of core crimping pieces 223 toward the terminal 2.

However, in the case of separately moving the upper die for core 70 and the pressing member 80, a terminal pressing surface 8110 is preferably arranged at a position above (toward the base end part of the upper die for core 7) a reference position H, which is the position of a deepest part of a groove of an upper die surface 710 in a state where the upper die for core 70 and the lower die for core 6 are closest to each other, in a moving direction of the pressing member 80 in a state where the pressing member 80 is closest to the lower die for core 6, and a core pressing surface 8210 is arranged at the same position as the reference position H. According to this configuration, a situation where the exposed core part 311 is damaged by the corners of the front end parts P1 of the core crimping pieces 223 is unlikely to occur, whereas the projecting width of the exposed core part 311 from the terminal 2 can be reliably reduced.

Further, in the case of separately forming the upper die for core 70 and the pressing member 80, it is not essential that the two are in close contact and there may be a clearance between tip parts of the two. However, it is more advantageous that the upper die for core 70 and the pressing member 80 are joined in close contact because the upper die for core 70 and the pressing member 80 are less likely to be deformed and dust and the like are less likely to be sandwiched between the two.

Figure 11:
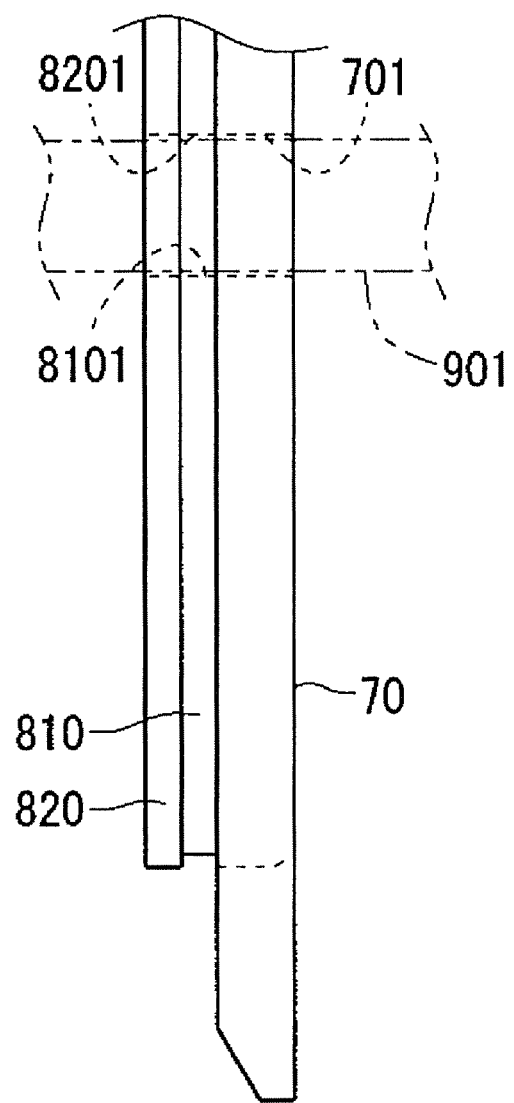
FIG. 11 is a side view showing an upper die for core and a pressing member according to a modification.

Further, although the terminal pressing member 81 and the core pressing member 82 are integrally formed in the above embodiment, they need not necessarily be integrally formed. For example, as shown in FIG. 11, an upper die for core 70 and a terminal pressing member 810 may be separately formed and the terminal pressing member 810 and a core pressing member 820 may be separately formed. Here, the core pressing member 820 is joined in close contact with the terminal pressing member 810 and the terminal pressing member 810 is joined in close contact with the upper die for core 70. Further, the upper die for core 70, the terminal pressing member 810 and the core pressing member 820 are respectively formed with positioning holes 701, 8101 and 8201 here. By inserting a positioning pin 901 into the positioning holes 701, 8101 and 8201 with the upper die for core 70 and the terminal pressing member 810 joined and the terminal pressing member 810 and the core pressing member 820 joined, the upper die for core 70, the terminal pressing member 810 and the core pressing member 820 are united and synchronously moved toward and away from the terminal 2 on the lower die for core 6. If the terminal pressing member 810 and the core pressing member 820 are separately formed as just described, there is an advantage of facilitating the additional attachment of the core pressing member 820 to the terminal pressing member 810, the single exchange of the terminal pressing member 810 or the core pressing member 820, and the like.

Further, the separately formed terminal pressing member 810 and core pressing member 820 may be independently (without synchronization) moved. For example, the upper die for core 70, the terminal pressing member 810 and the core pressing member 820 may be coupled to different actuators without being united. In this case, the terminal-equipped wire 1 can be produced by first moving the upper die for core 70 toward the lower die for core 6 to deform the respective caulking target areas A of the pair of core crimping pieces 223 and crimp them to the exposed core part 311, moving the terminal pressing member 810 toward the lower die for core 6 to press the parts of the pair of crimping pieces 223 protruding from the upper die surface 71 from above, and then pressing the part of the exposed core part 311 protruding from the pair of core crimping pieces 223 toward the terminal 2.

In the case of separately moving the upper die for core 70, the terminal pressing member 810 and the core pressing member 820, the terminal pressing surface 8110 is preferably arranged at the position above (toward the base end part of the upper die for core 7) the aforementioned reference position H in the moving direction of the terminal pressing member 810 in a state where the terminal pressing member 810 is closest to the lower die for core 6 as described above. Further, the core pressing surface 8201 is arranged at the same position as the reference position H in the moving direction of the core pressing member 820 in a state where the core pressing member 820 is closest to the lower die for core 6.

Note that, in the case of separately forming the terminal pressing member 810 and the core pressing member 820, it is not essential that the two are in close contact and there may be a clearance between tip parts of the two.

Further, although the terminal 2 includes the pair of coating crimping pieces 222 in the above embodiment, it needs not necessarily include the pair of coating crimping pieces 222.

Further, although the terminal pressing surface 811 is formed at the position shifted upward by a very short distance from the deepest part of the upper die surface 71 in the moving direction of the terminal pressing member 81 in the above embodiment, it may be shifted upward or downward from the above position within such a range that the end parts of the core crimping pieces 223 can be pressed.

Further, although the core pressing surface 821 is formed at the same position as the deepest part of the upper die surface 71 in the moving direction of the core pressing member 82 in the above embodiment, it may be shifted upward or downward from the above position within such a range that the tip edge part of the exposed core part 311 can be pressed.

Although this invention has been described in detail above, the above description is illustrative in all aspects and this invention is not limited thereto. It is understood that unillustrated numerous modifications can be envisaged without departing from the scope of this invention.

The invention claimed is:

1. A method for producing a terminal-equipped wire in which a crimping portion of a terminal is crimped to an exposed core part of a wire that extends forward from a coating of the wire to a front end of the wire, the crimping portion having opposite front and rear ends, the method comprising the steps of:
   a) arranging the exposed core part in the crimping portion so that the rear end of the core crimping portion is spaced forward of the coating and so that the front end of the crimping portion is spaced rearward of the front end of the wire;
   b) sandwiching a rear part of the crimping portion between a lower die surface of a lower die and concave upper die surface of an upper die for crimping the rear part of the crimping portion to the exposed core part; and
   c) pressing, from above, a front end part of the crimping portion protruding forward from the concave upper die surface, the pressing being carried out using a pressing member having a planar terminal pressing surface aligned orthogonal to a pressing direction and offset farther from the lower die surface than a deepest part of the concave upper die surface in a direction opposite to a pressing direction, and with
   the terminal pressing member not having a wall surface area extending along a moving direction of the terminal pressing member.

2. The method of claim 1, wherein:
the step c) is performed by pressing the end part of the crimping portion protruding from the upper die surface by the terminal pressing member moved in synchronization with the upper die when the upper die is moved toward the lower die to sandwich the crimping portion between the lower die and the upper die in the step b).

3. The method of claim 2, wherein:
the upper die and the terminal pressing member are integrally formed.

4. A method for producing a terminal-equipped wire in which a crimping portion of a terminal is crimped to an exposed core part of a wire that extends forward from a coating of the wire to a front end of the wire, the crimping portion having opposite front and rear ends, the method, comprising the steps of:
 a) arranging the exposed core part in the crimping portion so that the rear end of the core crimping portion is spaced forward of the coating and so that the front end of the core crimping portion is spaced rearward of the front end of the wire;
 b) sandwiching a rear part of the crimping portion between a lower die surface of a lower die and concave upper die surface of an upper die for crimping the rear part of the crimping portion to the exposed core part;
 c) pressing, from above, a front end part of the crimping portion protruding forward from the upper die surface, the pressing being carried out using a pressing member having a planar terminal pressing surface aligned orthogonal to a pressing direction and offset farther from the lower die surface than a deepest part of the concave upper die surface in a direction opposite to a pressing direction and with the terminal pressing member not having a wall surface area extending along a moving direction of the terminal pressing member; and
 d) pressing a part of the exposed core part protruding from the crimping portion toward the terminal.

5. The method of claim 4, wherein:
the part of the exposed core part protruding from the crimping portion is pressed from above by a lower end surface of a core pressing member moved toward the lower die in the step d); and
the lower end surface of the core pressing member is a surface not having a wall surface area extending along a moving direction of the core pressing member.

6. A terminal-equipped wire, comprising: a wire including a core having an end, a coating surrounding the core at locations spaced from the end of the core so that an exposed core part extends from the coating to the end of the core; and
 a terminal including a crimping portion crimped to the exposed core part of the wire, the crimping portion including a rear end between the coating and the end of the core and a front end between the rear end of the crimping portion and the end of the core, wherein:
the crimping portion includes a bottom plate and core crimping pieces in the form of long pieces extending from opposite sides of the bottom plate; target areas of the core crimping pieces adjacent the rear end of the crimping portion are crimped to the exposed core part by being compressed and deformed to define outwardly convex arcuate areas that embrace the exposed core part; and front end parts of the core crimping pieces adjacent the front end of the crimping portion and excluding the target parts are pressed toward the bottom plate portion from and have an upper side that is formed into a flat shape.

7. A terminal crimping device for crimping a crimping portion of a terminal to an exposed core part of a wire at a position in proximity to an end of a wire, the crimping portion having opposite front and rear ends, the terminal crimping device comprising:
 a lower die having lower die surface on which the crimping portion having the exposed core part arranged therein is arranged;
 an upper die having concave upper die surface arranged to face the lower die surface and configured to sandwich a part of the crimping portion between the lower die surface and the upper die surface and to crimp areas of the crimping portion adjacent the rear end thereof to the exposed core part by being moved toward the lower die; and
 a terminal pressing member configured to press areas of the crimping portion that are adjacent the front end of the crimping portion and protruding from the upper die surface from above by being moved toward the lower die;
wherein:
the terminal pressing member presses the areas of the crimping portion that are adjacent the front end of the crimping portion and protruding from the upper die surface from above by a lower end surface thereof; and
the lower end surface of the terminal pressing member is a surface not having a wall surface area extending along a moving direction of the terminal pressing member and a flat surface perpendicular to the moving direction of the terminal pressing member.

8. The terminal crimping device of claim 7, wherein the crimping portion has a length extending from the front end thereof to the rear end thereof, and the upper die has a length measured parallel to the length of the crimping portion that is about two-thirds of the length of the crimping portion.

9. The terminal crimping device of claim 7, wherein the upper die surface is concave.

10. The terminal crimping device of claim 9, wherein the lower end surface of the terminal pressing member is spaced farther from the lower die than a deepest part of the upper die surface.

11. The method of claim 1, further comprising coating the exposed core part and the crimping portion with a protective agent for film formation.

12. The terminal-equipped wire of claim 6, wherein the crimping portion has a length extending from the front end thereof to the rear end thereof, and the upper die has a length measured parallel to the length of the crimping portion that is about two-thirds of the length of the crimping portion.

13. The terminal-equipped wire of claim 6, further comprising a protective agent for film formation coated on the exposed core part and the crimping portion.

* * * * *